United States Patent
Norikane et al.

(10) Patent No.: US 10,226,918 B2
(45) Date of Patent: *Mar. 12, 2019

(54) THREE-DIMENSIONAL OBJECT FORMATION POWDER MATERIAL, THREE-DIMENSIONAL OBJECT FORMATION MATERIAL SET, AND THREE-DIMENSIONAL OBJECT PRODUCTION METHOD

(71) Applicant: Ricoh Company,Ltd., Tokyo (JP)

(72) Inventors: Yoshihiro Norikane, Kanagawa (JP); Yasutada Shitara, Shizuoka (JP); Teruki Kusahara, Shizuoka (JP); Takuya Saito, Kanagawa (JP); Takeo Yamaguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 429 days.

This patent is subject to a terminal disclaimer.

(21) Appl. No.: 14/816,370

(22) Filed: Aug. 3, 2015

(65) Prior Publication Data

US 2016/0040025 A1   Feb. 11, 2016

(30) Foreign Application Priority Data

Aug. 8, 2014 (JP) .................................. 2014-162593
Jun. 1, 2015 (JP) .................................. 2015-111482

(51) Int. Cl.
  *C09D 129/04*   (2006.01)
  *C09D 133/02*   (2006.01)
(Continued)

(52) U.S. Cl.
  CPC ............ *B33Y 80/00* (2014.12); *B29C 64/165* (2017.08); *B33Y 10/00* (2014.12); *B33Y 70/00* (2014.12);
(Continued)

(58) Field of Classification Search
  CPC .............. C09D 189/00; C09D 101/286; C09D 103/02; C09D 171/02; C09D 129/04;
(Continued)

(56) References Cited

U.S. PATENT DOCUMENTS 5,900,450 A * 5/1999 Tanaka ..................... C08K 9/06
                                                      423/335
8,668,852 B2 * 3/2014 Ookubo .................. C08J 3/122
                                                      264/113

(Continued)

FOREIGN PATENT DOCUMENTS

JP   2000-328106   11/2000
JP   2003-048253   2/2003
(Continued)

OTHER PUBLICATIONS

Machine translation of JP2005-132700, Harada, May 2005.*

*Primary Examiner* — Jun Li
(74) *Attorney, Agent, or Firm* — Oblon, McClelland, Maier & Neustadt, L.L.P.

(57) ABSTRACT

Provided is a three-dimensional object formation powder material used for three-dimensional object formation of forming a three-dimensional object by stacking up a plurality of powder material layers each bound by a resin and having a predetermined shape. The three-dimensional object formation powder material contains particles in which a plurality of cores are fixed by a water-soluble resin.

14 Claims, 3 Drawing Sheets

(51) Int. Cl.

| | |
|---|---|
| *C09D 171/02* | (2006.01) |
| *C09D 101/28* | (2006.01) |
| *C09D 189/00* | (2006.01) |
| *C09D 103/02* | (2006.01) |
| *B29C 67/00* | (2017.01) |
| *B33Y 80/00* | (2015.01) |
| *B33Y 10/00* | (2015.01) |
| *B33Y 70/00* | (2015.01) |
| *B29C 64/165* | (2017.01) |
| *C08K 3/10* | (2018.01) |
| *C08K 3/36* | (2006.01) |
| *C08K 3/20* | (2006.01) |
| *C08K 3/34* | (2006.01) |
| *C08K 3/22* | (2006.01) |
| *C08K 3/38* | (2006.01) |

(52) U.S. Cl.
CPC ....... *C09D 101/286* (2013.01); *C09D 103/02* (2013.01); *C09D 171/02* (2013.01); *C09D 189/00* (2013.01); *C08K 3/10* (2013.01); *C08K 3/20* (2013.01); *C08K 3/34* (2013.01); *C08K 3/36* (2013.01); *C08K 3/38* (2013.01); *C08K 2003/2206* (2013.01); *C08K 2003/2227* (2013.01); *C08K 2003/2237* (2013.01); *C08K 2003/387* (2013.01)

(58) Field of Classification Search
CPC ......... B33Y 10/00; B33Y 70/00; B33Y 80/00; B29C 64/165; C08K 3/38; C08K 2003/2206; C08K 2003/2237; C08K 3/34; C08K 3/20; C08K 3/36; C08K 3/10; C08K 2003/387; C08K 2003/2227
See application file for complete search history.

(56) References Cited

U.S. PATENT DOCUMENTS

| | | | |
|---|---|---|---|
| 2005/0003189 A1* | 1/2005 | Bredt | C08L 101/00 428/402 |
| 2006/0165546 A1 | 7/2006 | Yamada et al. | |
| 2009/0298033 A1* | 12/2009 | Suzuki | B28B 1/001 434/263 |
| 2010/0215555 A1* | 8/2010 | Jin | B01J 35/0006 422/222 |
| 2010/0226991 A1* | 9/2010 | Horcajada-Cortes | C07F 15/025 424/489 |
| 2011/0033772 A1* | 2/2011 | Tucker | B22F 3/1121 429/479 |
| 2011/0244007 A1 | 10/2011 | Matsui et al. | |
| 2012/0107561 A1* | 5/2012 | Hirama | B22F 1/0074 428/151 |
| 2013/0001460 A1* | 1/2013 | Tomiyama | C08G 18/3206 252/62 |
| 2014/0035205 A1 | 2/2014 | Hagiwara et al. | |

FOREIGN PATENT DOCUMENTS

| | | | | |
|---|---|---|---|---|
| JP | 2005132700 | * | 5/2005 | ............ B33Y 80/00 |
| JP | 2006-200030 | | 8/2006 | |
| JP | 2010-132811 | | 6/2010 | |
| JP | 2011-212668 | | 10/2011 | |
| JP | 2012-000966 | | 1/2012 | |
| JP | 2014-026996 | | 2/2014 | |
| WO | WO05/121229 A1 | | 12/2005 | |

* cited by examiner

THREE-DIMENSIONAL OBJECT FORMATION POWDER MATERIAL, THREE-DIMENSIONAL OBJECT FORMATION MATERIAL SET, AND THREE-DIMENSIONAL OBJECT PRODUCTION METHOD

BACKGROUND OF THE INVENTION

Field of the Invention

The present invention relates to a three-dimensional object formation powder material, a three-dimensional object formation material set, and a three-dimensional object formation method.

Description of the Related Art

Conventionally, metal moldings have been produced using molds. The techniques for producing metal moldings using molds have problems that molds are generally expensive, and are not necessarily suitable for production of complex fine moldings or for small-lot production. Recently, there has been a rise in the needs for small-lot production of complex fine three-dimensional objects. A powder sintering method, a powder bonding method, etc. have been proposed as techniques for answering the needs (see, e.g., Japanese Patent Application Laid-Open (JP-A) Nos. 2000-328106, 2006-200030, and 2003-48253).

The powder sintering method is a method of obtaining a desired three-dimensional object by irradiating a thin layer with laser light to form a thin sintered body, and repeating this process to stack up thin sintered bodies sequentially over the thin sintered body. The powder bonding method is a method of obtaining a desired three-dimensional object by using an adhesive agent instead of performing sintering in the powder sintering method.

However, the powder sintering method has problems that it is necessary to stack one layer and each time check and correct whether the layer is misfitted or not, and that the shape may collapse during the production because the strength of the stacked-up object is not sufficient. The powder bonding method cannot fill a void that may be left opened during stacking of powder layers because the powder cannot melt unlike by laser, and may produce a sintered body containing many voids without being able to improve the density.

When a squeegee is used to stack up layers of particles, voids are left opened and reduce the points of contact for sintering, which weakens the strength of a green body (a hardened product to be sintered) and a sintered body. Generally, reduction of particle diameter improves the density of a sintered body, which however is problematic because it is difficult to compactly pack small-diameter particles uniformly and densely with a coater.

SUMMARY OF THE INVENTION

An object of the present invention is to provide a three-dimensional object formation powder material with which it is possible to produce a three-dimensional object having few voids, a high strength, and a complex stereoscopic (three-dimensional (3D)) shape easily and efficiently with a powder material made of a metal, etc., without letting the object undergo a shape collapse before sintering, etc., and with a good dimensional precision.

A three-dimensional object formation powder material of the present invention as a means for solving the problems described above is a powder material used for three-dimensional object formation of forming a three-dimensional object by stacking up a plurality of powder material layers each bound by a resin and having a predetermined shape, the powder material containing:

particles in which a plurality of cores are fixed by a water-soluble resin.

The present invention can provide a three-dimensional object formation powder material with which it is possible to produce a three-dimensional object having few voids, a high strength, and a complex stereoscopic (three-dimensional (3D)) shape easily and efficiently with a powder material made of a metal, etc., without letting the object undergo a shape collapse before sintering, etc., and with a good dimensional precision.

DETAILED DESCRIPTION OF THE INVENTION (Three-Dimensional Object Formation Powder Material)

A three-dimensional object formation powder material of the present invention contains particles in which a plurality of cores are fixed by a water-soluble resin, and further contains other components according to necessity, and is used for three-dimensional object formation of forming a three-dimensional object by stacking up a plurality of powder material layers each bound by a resin and having a predetermined shape.

In the present invention, the three-dimensional object formation powder material contains particles in which a plurality of cores are bound and fixed by a water-soluble resin, and is used for three-dimensional object formation of forming a three-dimensional object by stacking up a plurality of three-dimensional object formation powder material layers in each of which the plurality of cores are aggregated and bound and fixed by the water-soluble resin, and each of which has a predetermined shape. With this material, a three-dimensional object having few voids, a high strength, a high dimensional precision, and a complex stereoscopic (three-dimensional (3D)) shape can be obtained, and as a result, a highly dense green body (a hardened product to be sintered) with no voids can be obtained.

<Core>

The cores are not particularly limited except that they should have be in the form of a powder or particles, and arbitrary cores may be selected according to the purpose. Examples of the material of the cores include a metal, a ceramics (including glass), carbon, a polymer, wood, and a bioaffinitive material. A metal, a ceramics, etc. that can be sintered finally are preferable in terms of obtaining a three-dimensional object having a high strength.

Examples of the metal include stainless (SUS) steel, iron, copper, silver, titanium, and zirconium, and an alloy of these. Among these, stainless (SUS) steel is preferable.

Examples of the stainless (SUS) steel include SUS304, SUS316, SUS317, SUS329, SUS410, SUS430, SUS440, and SUS630.

The stainless steel may be commercially available particles or powders made of these materials. Examples include SUS316L (PSS316L manufactured by Sanyo Special Steel Co., Ltd.).

Examples of the ceramics include an oxide, a carbide, a nitride, and a hydroxide. Among these, a metal oxide, and an amorphous inorganic substance exhibiting a glass transition phenomenon are preferable.

Examples of the metal oxide include silicic acid such as silica ($SiO_2$), orthosilicic acid ($H_4SiO_4$), metasilicic acid ($H_2SiO_3$), and metadisilicic acid ($H_2Si_2O_5$), boron oxide ($B_2O_3/B_2O_5$), phosphoric acid ($P_2O_5$), bismuth oxide ($Bi_2O_3$), alumina ($Al_2O_3$), zirconia ($ZrO_2$), titania ($TiO_2$), tellurium dioxide ($TeO_2$), vanadium pentoxide ($V_2O_5$), antimony oxide ($Sb_2O_5$), yttrium oxide ($Y_2O_3$), germanium dioxide ($GeO_2$), lead monoxide (PbO), and copper oxide (II) (CuO). One of these may be used alone, or two or more of these may be used in combination.

Examples of the amorphous inorganic substance exhibiting a glass transition phenomenon include glass.

Among the ceramics, zirconia and glass are preferable.

Various additives may be added to the ceramics according to necessity. Examples of the additives include sodium carbonate ($Na_9CO_3$), calcium carbonate ($Ca_2CO_3$), sodium oxide ($Na_2O$), potassium oxide ($K_2O$), lithium oxide ($Li_2O$), magnesium oxide (MgO), barium oxide (BaO), calcium oxide (CaO), strontium oxide (SrO), potassium nitrate ($KNO_3$), lithium chloride (LiCl), barium chloride (BaCl), zinc chloride ($ZnCl_2$), zinc bromide ($ZnBr_2$), calcium fluoride ($CaF_2$), barium fluoride ($BaF_2$), magnesium fluoride ($MgF_2$), beryllium fluoride ($BeF_2$), aluminium fluoride ($AlF_3$), indium fluoride ($InF_3$), zirconium fluoride ($ZrF_4$), lanthanum fluoride ($LaF_3$), orpiment ($As_2S_3$), and germanium sulfide ($GeS_2$). One of these may be used alone, or two or more of these may be used in combination.

In order for a desired functionality to be imparted to the ceramics, the ceramics may be subjected to treatments such as compression, thermal treatment, quenching, coloring, and metal film coating.

The ceramics may be commercially available particles or powders made of these materials. Examples include $SiO_2$ (EXCELICA SE-15 manufactured by Tokuyama Corporation), $AlO_2$ (TAIMICRON TM-5D manufactured by Taimei Chemicals Co., Ltd.), $ZrO_2$ (TZ-B53 manufactured by Tosoh Corporation), glass beads (SPL-30 manufactured by Unitika Limited), glass beads (SPM-30 manufactured by Unitika Limited), and micro glass beads (EMB-10 manufactured by Potters Ballotini Co., Ltd.).

Examples of the carbon include graphite, graphene, carbon nanotube, carbon nanohorn, and fullerene.

Examples of the polymer include publicly-known water-insoluble resins.

Examples of the wood include wood chip, and cellulose.

Examples of the bioaffinitive material include polylactic acid, and calcium phosphate.

For the purpose of imparting a better affinity with the water-soluble resin to the cores and other purposes, a publicly-known surface (reforming) treatment may be applied to the cores.

A number average particle diameter of the cores is preferably from 1 μm to 10 μm, and more preferably from 2 μm to 5 μm.

When the number average particle diameter is 1 μm or greater, the efficiency of producing a three-dimensional object is good, and treatability and a handling property are excellent. When it is 10 μm or less, the three-dimensional object formation powder material in which a plurality of cores are bound by a water-soluble resin has an appropriate size, and a narrow granularity distribution. Therefore, a three-dimensional object will have a low surface roughness and contain small inner voids, and hence have many points of contact for sintering. Hence, a sintered body will achieve a sufficient strength.

The number average particle diameter of the cores can be measured with a publicly-known particle diameter measuring instrument, for example, MICRO TRACK HRA (manufactured by Nikkiso Co., Ltd.) according to a publicly-known method.

The granularity distribution of the cores is not particularly limited, and may be appropriately selected according to the purpose.

The contour, surface area, circularity, flowability, wettability, etc. of the cores may be appropriately selected according to the purpose.

<Water-Soluble Resin>

The water-soluble resin is not particularly limited except that it should be water-soluble, and an arbitrary water-soluble resin may be selected according to the purpose.

In the present invention, the water solubility of the water-soluble resin refers to a level that when 1 g of the water-soluble resin is mixed and stirred in 100 g of water having a temperature of 100° C., 90% by mass or greater of the mixed resin dissolves.

The viscosity of a 4% by mass (w/w %) aqueous solution of the water-soluble resin at 20° C. is preferably 40 mPa·s or lower, more preferably from 1 mPa·s to 35 mPa·s, and more preferably from 5 mPa·s to 30 mPa·s.

When the viscosity is 40 mPa·s or lower, the plurality of core particles can fall apart and fluidize when an aqueous liquid is delivered to the three-dimensional object formation powder material, which makes it possible to fill any voids. Further, there is another advantage that a hardened product (a three-dimensional object, a hardened product to be sintered) of the three-dimensional object formation powder material (layers) will have a sufficient strength, and will not have troubles such as shape collapse during a subsequent treatment or handling such as sintering. Furthermore, a hardened product (a three-dimensional object, a hardened product to be sintered) of the three-dimensional object formation powder material (layers) formed by delivering an aqueous liquid to the three-dimensional object formation powder material will have a good dimensional precision.

The viscosity can be measured according to, for example, JIS K7117.

A degree of polymerization of the water-soluble resin is preferably from 100 to 2,000, and more preferably from 100 to 1,000. When the degree of polymerization is 100 or greater, the formed dry object (green body) resulting from the three-dimensional object formation will have a strength with which it can stand by itself. When it is 2,000 or less, the water-soluble resin can rapidly dissolve in the liquid applied by ink jetting.

The degree of polymerization of the water-soluble resin refers to a degree of polymerization of vinyl alcohol when the water-soluble resin is a polyvinyl alcohol resin. The degree of polymerization of the water-soluble resin refers to a total of a degree of polymerization of butanediol and a degree of polymerization of vinyl alcohol when the water-soluble resin is a butanediol-vinyl alcohol copolymer. The degree of polymerization of the water-soluble resin refers to a degree of polymerization of glucose when the water-soluble resin is starch. The degree of polymerization of the water-soluble resin refers to a degree of polymerization of acrylic acid when the water-soluble resin is sodium polyacrylate. The degree of polymerization of the water-soluble resin refers to a degree of polymerization of glucose when the water-soluble resin is carboxy methyl cellulose sodium. The degree of polymerization of the water-soluble resin refers to a degree of polymerization of amino acid when the water-soluble resin is gelatin.

Examples of the water-soluble resin having the water-solubility and the viscosity described above include a water-soluble resin, and a water-soluble prepolymer.

Examples of the water-soluble resin include polyvinyl alcohol resin, modified polyvinyl alcohol resin, polyacrylic acid resin, cellulose resin, starch, gelatin, vinyl resin, amide resin, imide resin, acrylic resin, and polyethylene glycol. One of these may be used alone, or two or more of these may be used in combination. Among these, polyvinyl alcohol resin, modified polyvinyl alcohol resin, polyacrylic acid resin, cellulose resin, starch, gelatin, and polyethylene glycol are preferable, and polyvinyl alcohol resin is more preferable.

As long as water solubility is expressed, the water-soluble resin may be a homopolymer or a heteropolymer (copolymer), may be modified, may have a publicly-known functional group incorporated, or may be in the form of a salt. Hence, when the water-soluble resin is a polyvinyl alcohol resin, it may be polyvinyl alcohol, or may be polyvinyl alcohol modified with acetoacetyl group, acetyl group, silicone, or the like (acetoacetyl group-modified polyvinyl alcohol, acetyl group-modified polyvinyl alcohol, silicone-modified polyvinyl alcohol, or the like), or may be a butanediol-vinyl alcohol copolymer or the like. When the water-soluble resin is a polyacrylic acid resin, it may be polyacrylic acid, or may be a salt such as sodium polyacrylate. When the water-soluble resin is a cellulose resin, it may be cellulose, or may be carboxy methyl cellulose (CMC) or the like. When the water-soluble resin is an acrylic resin, it may be, for example, polyacrylic acid, sodium polyacrylate, and acrylic acid-maleic anhydride copolymer.

Examples of the water-soluble prepolymer include an adhesive water-soluble isocyanate prepolymer contained in a water stop agent or the like.

The water-soluble resin may be one of those above alone or a combination of two or more of those above, or may be an appropriately synthesized product or a commercially available product.

Examples of the commercially available product include polyvinyl alcohol (PVA-205C and PVA-220C manufactured by Kuraray Co., Ltd.), polyacrylic acid (JULIMER AC-10 manufactured by Toagosei Co., Ltd.), sodium polyacrylate (JULIMER AC-103P manufactured by Toagosei Co., Ltd.), acetoacetyl group-modified polyvinyl alcohol (GOHSENX Z-300 GOHSENX Z-100, GOHSENX Z-200, GOHSENX Z-205, GOHSENX Z-210, and GOHSENX Z-220 manufactured by Nippon Synthetic Chemical Industry Co., Ltd.), carboxy group-modified polyvinyl alcohol (GOHSENX T-330, GOHSENX T-350, and GOHSENX T330T manufactured by Nippon Synthetic Chemical Industry Co., Ltd.), butanediol-vinyl alcohol copolymer (NICHIGO G-POLYMER OKS-8041 manufactured by Nippon Synthetic Chemical Industry Co., Ltd.), carboxy methyl cellulose (CELLOGEN 5A manufactured by DKS Co., Ltd.), starch (HISTARD PSS-5 manufactured by Sanwa Starch Co., Ltd.), and gelatin (BEMATRIX GELATIN manufactured by Nitta Gelatin Inc.).

A content of the water-soluble resin is preferably from 0.5% by volume to 15% by volume, and more preferably from 1% by volume to 2% by volume relative to the cores. When the content is 0.5% by volume or greater, there is an advantage that the cores, which have a binding force to bind with each other, are not frictioned with each other and their aggregates do not fall apart while they are conveyed or in a layer stacking step. When the content is 15% by volume or less, there is an advantage that the water-soluble resin sufficiently dissolves in a dissolving liquid.

Publicly-known other components that may be contained in the three-dimensional object formation powder material are not particularly limited, and arbitrary components may be selected according to the purpose. Examples thereof include a fluidizer, a filler, a leveling agent, and a sintering aid. It is preferable that the three-dimensional object formation powder material contain a fluidizer, because a layer or the like of the three-dimensional object formation powder material can be formed easily and efficiently. It is preferable that the three-dimensional object formation powder material contain a filler, because it is harder for voids or the like to be produced in a hardened product to be obtained (a three-dimensional object, a hardened product to be sintered). It is preferable that the three-dimensional object formation powder material contain a leveling agent, because the three-dimensional object formation powder material will have a better wettability and become easier to handle, etc. It is preferable that the three-dimensional object formation powder material contain a sintering aid, because a sintering process of a hardened product to be obtained (a three-dimensional object, a hardened product to be sintered) can be performed at a lower temperature.

<Method for Producing Three-Dimensional Object Formation Powder Material>

The method for producing the three-dimensional object formation powder material is not particularly limited, and an arbitrary method may be selected according to the purpose. Preferable examples of the method include a method of coating the cores with the water-soluble resin according to a publicly-known coating method.

A method for aggregating the cores and binding them by the water-soluble resin is not particularly limited, and an arbitrary publicly-known method may be employed. Examples of such an aggregate formation method include rolling flow coating, spray drying, stirring mixing adding, clipping, and kneader coating. These coating methods may be performed with various publicly-known commercially available coating machines and granulation machines.

Among these, a spray granulation method, and a particle production method (precise spray granulation method) described in JP-A No. 2011-212668 can produce very uniform particles by spraying the cores and the water-soluble resin and granulating them to particles, and can drastically improve particle controllability of the three-dimensional object formation powder material.

—Physical Properties, Etc. of Three-Dimensional Object Formation Powder Material—

A number average particle diameter Dn of the three-dimensional object formation powder material is not particularly limited, and may be appropriately selected according to the purpose. However, it is preferably from 15 μm to 50 μm, and more preferably from 15 μm to 30 μm.

When the number average particle diameter Dn is 15 μm or greater, there are advantages that the efficiency of producing a three-dimensional object is good, and that treatability and a handling property are excellent. When it is 50 μm or less, a thin layer formed of the three-dimensional object formation powder material can be filled with the three-dimensional object formation powder material with a good filling rate, and will scarcely contain voids. Therefore, a three-dimensional object having a sufficient strength can be obtained.

A granularity distribution Dv/Dn, which is a ratio of a volume average particle diameter Dv of the three-dimensional object formation powder material to the number average particle diameter Dn thereof, is preferably 1.4 or less, and more preferably from 1.1 to 1.4. When the granularity distribution Dv/Dn is 1.1 or greater, a thin layer formed of the three-dimensional object formation powder material can be filled with the three-dimensional object formation powder material with a sufficient filling rate, and will scarcely contain voids. Therefore, a three-dimensional object having a sufficient strength can be obtained. On the other hand, when the granularity distribution Dv/Dn is 1.4 or less, there are advantages that a thin three-dimensional object formation powder material layer can be formed because there are few coarse particles, and that there are no minute particles and the powder particles do not cause auto-agglomeration.

The number average particle diameter Dn and the granularity distribution Dv/Dn of the three-dimensional object formation powder material can be measured with a publicly-known particle diameter measuring instrument, for example, MICRO TRACK HRA MT-3300EXII (manufactured by Nikkiso Co., Ltd.), MULTISIZER III (manufactured by Coulter Counter Inc.), and FPIA-3000 (manufactured by Sysmex Corporation) according to a publicly-known method.

As the properties of the three-dimensional object formation powder material, a repose angle thereof is preferably 40° or less, more preferably from 30° to 34°, and particularly preferably 32°.

When the repose angle is 40° or less, there is an advantage that the three-dimensional object formation powder material can be efficiently stably positioned on a desired place of a supporting member.

The repose angle can be measured with, for example, a powder characteristic measuring instrument (POWDER TESTER PT-N TYPE manufactured by Hosokawa Micron Corporation).

The three-dimensional object formation powder material of the present invention can be used favorably for easy and efficient production of various compacts and structures, and can be used particularly favorably for a three-dimensional object formation material set of the present invention described below, a three-dimensional object production method of the present invention, and a hardened product to be sintered obtained in the present invention.

With the three-dimensional object formation powder material, it is possible to produce a three-dimensional object having a complex three-dimensional shape easily, efficiently, and with a good dimensional precision, only by delivering the aqueous liquid to the three-dimensional object formation powder material. The three-dimensional object obtained in this way has a sufficient hardness.

The three-dimensional object is a hardened product (a three-dimensional object, a hardened product to be sintered), and has an excellent treatability and an excellent handling property without undergoing a shape collapse even when it is held in a hand, brought into and out from a mold, or blown with air to remove any excess of the three-dimensional object formation powder material. The hardened product may be used as it is, or as a hardened product to be sintered, may further be subjected to sintering to be produced as a compact. When it is sintered, the compact resulting from the sintering will contain no unnecessary voids or the like. Therefore, a compact having a beautiful appearance can be obtained easily.

(Three-Dimensional Object Formation Material Set)

A three-dimensional object formation material set of the present invention includes the three-dimensional object formation powder material of the present invention, and an aqueous liquid, and further includes other components, etc. according to necessity.

<Aqueous Liquid>

The aqueous liquid contains at least an aqueous medium and a cross-linking agent, preferably contains a water-soluble organic solvent and a surfactant, and further contains other components according to necessity.

—Aqueous Medium—

Examples of the aqueous medium include water, alcohol such as ethanol, ether, and ketone. The aqueous medium may be an organic solvent in which water contains other components than water, such as alcohol.

—Cross-Linking Agent—

The cross-linking agent is not particularly limited, except that it should have a capability of cross-linking the water-soluble resin, and an arbitrary cross-linking agent may be selected according to the purpose. Examples thereof include a metal salt, a metal complex, an organozirconium compound, an organotitanium compound, and a chelate agent.

Examples of the organozirconium compound include zirconium oxychloride, ammonium zirconium carbonate, and ammonium zirconium lactate.

Examples of the organotitanium compound include titanium acylate, and titanium alkoxide.

One of these may be used alone, or two or more of these may be used in combination. Among these, a metal salt is more preferable.

Preferable examples of the metal salt include those that ionize to a divalent or higher cationic metal in water. Specific examples thereof include zirconium oxychloride octahydrate (tetravalent), aluminium hydroxide (trivalent), magnesium hydroxide (divalent), titanium lactate ammonium salt (tetravalent), basic aluminium acetate (trivalent), ammonium salt of zirconium carbonate (tetravalent), and titanium triethanol aminate (tetravalent).

The metal salt may be a commercially available product. Examples of the commercially available product include zirconium oxychloride octahydrate (zirconium oxychloride manufactured by Daiichi Kigenso Kagaku Kogyo Co., Ltd.), aluminum hydroxide (manufactured by Wako Pure Chemical Industries, Ltd.), magnesium hydroxide (manufactured by Wako Pure Chemical Industries, Ltd.), titanium lactate ammonium salt (ORGATIX TC-300 manufactured by Matsumoto Fine Chemical Co., Ltd.), zirconium lactate ammonium salt (ORGATIX ZC-300 manufactured by Matsumoto Fine Chemical Co., Ltd.), basic aluminium acetate (manufactured by Wako Pure Chemical Industries, Ltd.), bisvinyl sulfone compound (VS-B (K-FJC) manufactured by Fuji Fine Chemical Co., Ltd.), ammonium salt of zirconium carbonate (ZIRCOZOL AC-20 manufactured by Daiichi Kigenso Kagaku Kogyo Co., Ltd.), titanium triethanol aminate (ORGATIX TC-400 manufactured by Matsumoto Fine Chemical Co., Ltd.), glyoxylate salt (SAFELINK SPM-01 manufactured by Nippon Synthetic Chemical Industry Co., Ltd.), and adipic acid dihydrazide (manufactured by Otsuka Chemical Co., Ltd.). It is preferable that the metal in the metal salt be divalent or higher, because the cross-linking strength can be enhanced, and the three-dimensional object to be obtained (a hardened product to be sintered) will have a favorable strength.

The "cross-linking agent" in the present invention refers to a compound that has a site cross-linking-reactive with a functional group of a cross-linking target (an organic material such as a polymer), and that by undergoing a cross-linking reaction, itself becomes a constituent component of a bonding site of a cross-linking bond between cross-linking target points. Hence, the cross-linking agent is conceptually different from a so-called "initiator" such as a peroxide (organic peroxide) and a reducing substance that itself does not become a constituent component of a cross-linking bonding site, but initiates or promotes a radical reaction by itself pyrolyzing or photolyzing to produce free radicals, having them added to an unsaturated monomer to open double bonds, simultaneously causing a new radical reaction, and repeating this process to thereby promote polymerization, or by abstracting hydrogen atoms bound to carbon atoms of a saturated compound to produce new radicals, and having the produced radicals recombine to thereby form a bridge in the saturated compound. Therefore, the "initiator" is clearly distinguished from the "cross-linking agent" of the present invention.

The content (concentration) of the cross-linking agent in the aqueous liquid is not particularly limited, and may be appropriately selected according to the purpose. However, a concentration at which the content of the cross-linking agent is from 0.1 parts by mass (% by mass) to 50 parts by mass (% by mass) relative to 100 parts by mass of the water-soluble resin is preferable. A concentration at which the content of the cross-linking agent is from 0.5 parts by mass (% by mass) to 40 parts by mass (% by mass) relative to 100 parts by mass of the water-soluble resin is more preferable. A concentration at which the content of the cross-linking agent is from 1 part by mass (% by mass) to 35 parts by mass (% by mass) relative to 100 parts by mass of the water-soluble resin is particularly preferable.

When the concentration is 0.1% by mass or higher, a hardened product (a three-dimensional object) formed of three-dimensional object formation powder material (layers) obtained by delivering the aqueous liquid to the three-dimensional object formation powder material will have a sufficient strength. When the concentration is 50% by mass or lower, a hardened product (a three-dimensional object) formed of three-dimensional object formation powder material (layers) obtained by delivering the aqueous liquid to the three-dimensional object formation powder material will have a good dimensional precision.

—Water-Soluble Organic Solvent—

The water-soluble organic solvent is not particularly limited, and arbitrary water-soluble organic solvent may be selected according to the purpose. Examples thereof include 1,2,6-hexanetriol, 1,2-butanediol, 1,2-hexanediol, 1,2-pentanediol, 1,3-dimethyl-2-imidazolidinone, 1,3-butanediol, 1,3-propanediol, 1,4-butanediol, 1,5-pentanediol, 1,6-hexanediol, 2,2-dimethyl-1,3-propanediol, 2,3-butanediol, 2,4-pentanediol, 2,5-hexanediol, 2-ethyl-1,3-hexanediol, 2-pyrrolidone, 2-methyl-1,3-propanediol, 2-methyl-2,4-pentanediol, 3-methyl-1,3-butanediol, 3-methyl-1,3-hexanediol, N-methyl-2-pyrrolidone, N-methyl pyrrolidinone, β-butoxy-N,N-dimethyl propion amide, β-methoxy-N,N-dimethyl propion amide, γ-butyrolactone, ε-caprolactam, ethylene glycol, ethylene glycol-n-butyl ether, ethylene glycol-n-propyl ether, ethylene glycol phenyl ether, ethylene glycol mono-2-ethyl hexyl ether, ethylene glycol monoethyl ether, glycerin, diethylene glycol, diethylene glycol-n-hexyl ether, diethylene glycol methyl ether, diethylene glycol monoethyl ether, diglycerin, dipropylene glycol, dipropylene glycol-n-propyl ether, dipropylene glycol monomethyl ether, dimethyl sulfoxide, sulfolane, thiodiglycol, tetraethylene glycol, triethylene glycol, triethylene glycol ethyl ether, triethylene glycol dimethyl ether, triethylene glycol monobutyl ether, triethylene glycol methyl ether, tripropylene glycol, tripropylene glycol-n-propyl ether, tripropylene glycol methyl ether, trimethylol ethane, trimethylol propane, propyl propylene diglycol, propylene glycol, propylene glycol-n-butyl ether, propylene glycol-t-butyl ether, propylene glycol phenyl ether, propylene glycol monoethyl ether, hexylene glycol, polyethylene glycol, and polypropylene glycol. One of these may be used alone, or two or more of these may be used in combination.

The content of the water-soluble organic solvent is preferably from 20% by mass to 60% by mass, and more preferably from 30% by mass to 50% by mass relative to the whole amount of the aqueous liquid. When the content of the water-soluble organic solvent is 20% by mass or greater, there is an advantage that the aqueous liquid has a good water retention ability and does not easily dry during storage, and can be tested normally because it does not dry over a nozzle surface during the test and can be jetted with a good stability. On the other hand, when the content of the water-soluble organic solvent is 60% by mass or less, there is an advantage that the aqueous liquid has an adequate viscosity, can be filled in a head favorably, and can be less flammable.

—Surfactant—

Examples of the surfactant include an anionic surfactant, a nonionic surfactant, an amphoteric surfactant, an acetylene glycol-based surfactant, a fluorosurfactant, and a silicone surfactant. One of these may be used alone, or two or more of these may be used in combination.

—Other Components—

Examples of the other components include a preservative, an antiseptic, a stabilizing agent, and a pH adjustor.

As the other components, arbitrary components may be selected depending on the kind of a unit configured to deliver the aqueous liquid, and various conditions such as frequency of use and amount, etc. When an inkjet method is employed to deliver the aqueous liquid, arbitrary components may be selected in view of influences due to, for example, clogging of a nozzle head of an inkjet printer, etc.

A method for preparing the aqueous liquid is not particularly limited, and an arbitrary method may be selected according to the purpose. Examples thereof include a method of adding and mixing the cross-linking agent, the water-soluble organic solvent, the surfactant, and according to necessity, the other components in the aqueous medium.

The three-dimensional object formation material set of the present invention can be used favorably for production of various compacts and structures, and can be particularly favorably used for a three-dimensional object production method of the present invention described below, and a hardened product to be sintered obtained in the present invention.

When the three-dimensional object formation material set is used to produce a three-dimensional object, it is possible to produce a three-dimensional object having a complex three-dimensional shape easily, efficiently, and with a good dimensional precision, only by making the aqueous liquid containing the cross-linking agent act on the three-dimensional object formation powder material. The three-dimensional object obtained in this way is a hardened product (a three-dimensional object) having a sufficient hardness, and has an excellent treatability and an excellent handling property without undergoing a shape collapse even when it is held in a hand, brought into and out from a mold, or blown with air to remove any excess of the three-dimensional object formation powder material. The hardened product (a three-dimensional object) may be used as it is, or as a hardened product to be sintered, may further be subjected to sintering to be produced as a compact (a three-dimensional object). When it is sintered, the compact resulting from the sintering will contain no unnecessary voids or the like. Therefore, a compact having a beautiful appearance can be obtained easily.

<Hardened Product to be Sintered>

A hardened product to be sintered, which is obtained in the present invention, is a hardened product obtained by delivering the aqueous liquid to the three-dimensional object formation powder material of the present invention described above, and used for producing a compact by sintering.

The hardened product to be sintered has a sufficient strength although it has been obtained only by delivering the aqueous liquid to the three-dimensional object formation powder material. In the hardened product to be sintered, the cores are present densely (at a high filling rate), and the water-soluble resin is present only slightly around the cores. Therefore, when it is subjected to sintering or the like later, the amount of organic components that have been volatilized (degreased) from the resulting compact (a three-dimensional object) can be suppressed unlike when a conventional hardened product of powders or particles obtained by using an adhesive is sintered. Therefore, the obtained compact contains no unnecessary voids (marks of degreasing), and a compact (a three-dimensional object) having a beautiful appearance can be obtained.

The strength of the hardened product to be sintered is such a level at which it does not undergo a shape collapse or the like when the surface thereof is rubbed, and such a level at which it does not undergo cracking or the like when it is blown with air from a distance of 5 cm away with an air gun having a nozzle caliber of 2 mm and an air pressure of 0.3 MPa.

The hardened product to be sintered can be obtained only by delivering water containing the cross-linking agent to the three-dimensional object formation powder material, has a sufficient hardness, and is excellent in treatability and a handing property without undergoing a shape collapse even when it is held in a hand, brought into or out from a mold, or blown with air to remove any excess of the three-dimensional object formation powder material. When the hardened product to be sintered is sintered, the compact resulting from the sintering will contain no unnecessary voids or the like, and a compact having a beautiful appearance can be obtained easily.

(Three-Dimensional Object Production Method and Three-Dimensional Object Production Apparatus)

A three-dimensional object production method of the present invention includes a three-dimensional object formation powder material layer forming step, and a hardened product forming step, and further includes other steps such as a sintering step according to necessity.

A three-dimensional object production apparatus used in the present invention includes a three-dimensional object formation powder material layer forming unit, and a hardened product forming unit, and further includes other units such as a sintering unit according to necessity.

<Three-Dimensional Object Formation Powder Material Layer Forming Step and Three-Dimensional Object Formation Powder Material Layer Forming Unit>

The three-dimensional object formation powder material layer forming step is a step of forming a three-dimensional object formation powder material layer with the three-dimensional object formation powder material of the present invention, and preferably performed by the three-dimensional object formation powder material forming unit.

—Supporting Member—

The supporting member is not particularly limited except that it should be able to have the three-dimensional object formation powder material mounted thereon, and an arbitrary supporting member may be selected according to the purpose. Examples thereof include a table having a mounting surface over which to mount the three-dimensional object formation powder material, and a base plate of an apparatus shown in FIG. 1 of JP-A No. 2000-328106.

The surface of the supporting member, i.e., the mounting surface over which to mount the three-dimensional object formation powder material may be a smooth surface, a coarse surface, a flat surface, or a curved surface. However, it is preferable that the surface have a low affinity with the water-soluble resin of the three-dimensional object formation powder material when the water-soluble resin dissolves in water and is cross-linked by the action of the cross-linking agent.

It is preferable that the affinity between the mounting surface and the dissolved cross-linked water-soluble resin be lower than the affinity between the cores and the dissolved cross-linked water-soluble resin, because it will be easy to separate the obtained three-dimensional object (a hardened product to be sintered) from the mounting surface.

—Formation of Three-Dimensional Object Formation Powder Material Layer—

A method for mounting the three-dimensional object formation powder material over the supporting member is not particularly limited, and an arbitrary method may be selected according to the purpose. Preferable examples of a method for mounting the powder material in the form of a thin layer include a method using a publicly-known counter rolling mechanism (a counter roller) or the like, which is used in a selective laser sintering method described in Japanese Patent (JP-B) No. 3607300, a method of spreading the three-dimensional object formation powder material in the form of a thin layer with a member such as a brush, a roller, and a blade, a method of spreading the three-dimensional object formation powder material in the form a thin layer by pressing the surface of the three-dimensional object formation powder material with a pressing member, and a method using a publicly-known three-dimensional object production apparatus.

The following steps may be performed to mount the three-dimensional object formation powder material in the form of a thin layer over the supporting member using the counter rolling mechanism (counter roller), the brush or the blade, or the pressing member, etc. That is, with the counter rolling machine (a counter roller), the brush or roller, or blade, the pressing member, or the like, the three-dimensional object formation powder material is mounted over the supporting member that is disposed within an outer frame (may also be referred to as "mold", "hollow cylinder", "tubular structure", etc.) such that the supporting member can be lifted up or down while sliding over the inner wall of the outer frame. Here, in the case where the supporting member is a member that can be lifted up or down within the outer frame, the supporting member is disposed at a position slightly below the upper end opening of the outer frame, i.e., at a position below the upper end opening by an amount corresponding to the thickness of the three-dimensional object formation powder material layer, and then the three-dimensional object formation powder material is mounted over the supporting member. In this way, the three-dimensional object formation powder material can be mounted in the form of a thin layer over the supporting member.

When the aqueous liquid is made to act on the three-dimensional object formation powder material. mounted in the form of a thin layer in this way, the layer is hardened the water-soluble resin in the three-dimensional object formation powder material is dissolved and cross-linked).

Then, when the three-dimensional object. formation powder material is mounted in the form of a thin layer over the obtained hardened thin layer in the same manner as described above, and the aqueous liquid containing the cross-linking agent is made to act on the (layer of) the three-dimensional object formation powder material mounted in the form of a thin layer, the layer is hardened (i.e., the water-soluble resin in the three-dimensional object formation powder material is dissolved and cross-linked). This hardening occurs not only in the (layer of) the three-dimensional object formation powder material mounted in the form. of a thin layer, but also in the hardened thin layer present below it that is obtained by the previous hardening. As a result, a hardened product (a three-dimensional object, a hardened product to be sintered) having a thickness corresponding to about double a layer of the three-dimensional object formation powder material mounted in the form of a thin layer is obtained.

Further, an automatic simple manner using the publicly-known three-dimensional object production apparatus may be employed to mount the three-dimensional object formation powder material into a thin layer over the supporting member. Typically, the three-dimensional object formation production apparatus includes a recoater configured to deposit a layer of the three-dimensional object formation powder material, a movable supply tank from which the three-dimensional object formation powder material is supplied over the supporting member, and a movable shaping tank in which the three-dimensional object formation powder material is mounted in the form of a thin layer and such thin layers are stacked. In the three-dimensional object production apparatus, it is possible to have the surface of the supply tank located slightly above the surface of the shaping tank constantly, by lifting up the supply tank, by lifting down the shaping tank, or by both, it is possible to place the three-dimensional object formation powder material in the form of a thin layer by actuating the recoater from the supply tank side, and it is possible to stack thin layers of the three-dimensional object formation powder material by repeatedly moving the recoater.

The thickness of the three-dimensional object formation powder material layer is not particularly limited, and may be appropriately selected according to the purpose. However, an average thickness per layer is preferably from 30 µm to 500 µm, and more preferably from 60 µm to 300 µm.

When the thickness is 30 µm or greater, a hardened product (a three-dimensional object, a hardened product to be sintered) formed of three-dimensional object formation powder material (layers) obtained by delivering the aqueous liquid to the three-dimensional object formation powder material will have a sufficient strength. When the thickness is 500 µm or less, a hardened product (a three-dimensional object, a hardened product to be sintered) formed of three-dimensional object formation powder material (layers) obtained by delivering the aqueous liquid to the three-dimensional object formation powder material will have a good dimensional precision.

The method for measuring the average thickness is not particularly limited, and the average thickness can be measured according to a publicly-known method.

<Hardened Product Forming Step and Hardened Product Forming Unit>

The hardened product forming step is a step of forming a hardened product of the three-dimensional object formation powder material layer by delivering the aqueous liquid to a predetermined region of the three-dimensional object formation powder material layer, and preferably performed by the hardened product forming unit.

A method for delivering the aqueous liquid to the three-dimensional object formation powder material is not particularly limited, and an arbitrary method may be selected according to the purpose. Examples thereof include a dispenser method, a spray method, and an inkjet method. To practice these methods, it is preferable to use a publicly-known apparatus as the hardened product forming unit.

Among these, the dispenser method is excellent in liquid droplet quantitativity, but has a small coating coverage. The spray method can form minute jetting objects easily, has a wide coating coverage and excellent coating performance, but has poor liquid droplet quantitativity, and may have the powder fly away with a sprayed flow. Therefore, the inkjet method is particularly preferable for the present invention. The inkjet method is preferable in that it is better than the spray method in liquid droplet quantitativity, has a wider coating coverage than that of the dispenser method, and can form a complex three-dimensional shape precisely and efficiently.

When the inkjet method is employed, the hardened product forming unit has a nozzle capable of delivering the aqueous liquid to the three-dimensional object formation powder material layer according to the inkjet method. As the nozzle, a nozzle of a publicly-known inkjet printer can be favorably used. Further, the inkjet printer can be favorably used as the hardened product forming unit. Preferable examples of the inkjet printer include SG7100 manufactured by Ricoh Company, Ltd. The inkjet printer is preferable in that it can perform coating at a high speed, because it can drop the aqueous liquid in a large amount at a time and has a wide coating coverage.

In the present invention, when an inkjet printer capable of delivering the aqueous liquid precisely at a high efficiency is used, the nozzle thereof or the head of the nozzle will not be clogged or corroded, because the aqueous liquid is free of a solid such as particles, and a polymeric high-viscosity material such as a resin. Further, when the aqueous liquid is delivered (jetted) onto the three-dimensional object formation powder material layer, it can permeate the water-soluble resin contained in the three-dimensional object formation powder material efficiently, leading to an excellent three-dimensional object productivity. As a further advantage, a dimensionally precise object with no unexpected volume expansion or the like can be obtained easily, in a short time, and efficiently, because no polymeric compound such as a resin is delivered.

The cross-linking agent can also function as a pH adjustor in the aqueous liquid. When the inkjet method is employed to deliver the aqueous liquid to the three-dimensional object formation powder material layer, the pH of the aqueous liquid is preferably from 5 (weakly acidic) to 12 (basic), and more preferably from 8 to 10 (weakly basic), in terms of preventing corrosion and clogging of the nozzle head portion of the nozzle used. A publicly-known pH adjustor may be used in order to adjust the pH.

<Other Steps and Other Units>

Examples of the other steps include a drying step, a sintering step, a surface protection treatment step, and a coating step.

The drying step is a step of drying the hardened product (a three-dimensional object, a hardened product to be sintered) obtained in the hardened product forming step. In the drying step. it is possible not only to remove a water content and an organic solvent contained in the hardened product (a three-dimensional object, a hardened product to be sintered), but also to remove (degrease) an organic substance contained therein. Examples of the drying unit include a publicly-known dryer.

The sintering step is a step of sintering the hardened product (a three-dimensional object, a hardened product to be sintered) formed in the hardened product forming step. By performing the sintering step, it is possible to transform the hardened product (a three-dimensional object, a hardened product to be sintered) to an integrated compact (a three-dimensional object) of a metal or a ceramics. Examples of the sintering unit include a publicly-known sintering furnace.

The surface protection treatment step is a step of performing, for example, formation of a protection layer over the hardened product (a three-dimensional object, a hardened product to be sintered) formed in the hardened product forming step. By performing the surface protection treatment step, it is possible to provide the surface of the hardened product (a three-dimensional object) with a durability or the like with which the hardened product (a three-dimensional object) can be subjected to use, etc. as it is. Specific examples of the protection layer include a waterproof layer, a weather resistant layer, a light resistant layer, a heat insulating layer, and a gloss layer. Examples of the surface protection treatment unit include publicly-known surface protection treatment apparatuses such as a spray machine, and a coating machine.

The coating step is a step of applying a coating over the hardened product (a three-dimensional object, a hardened product to be sintered) formed in the hardened product forming step. By performing the coating step, it is possible to color the hardened product (a three-dimensional object) in a desired color. Examples of the coating unit include publicly-known coating machines such as coating machines using a spray, a roller, a brush, etc.

Figure 1:
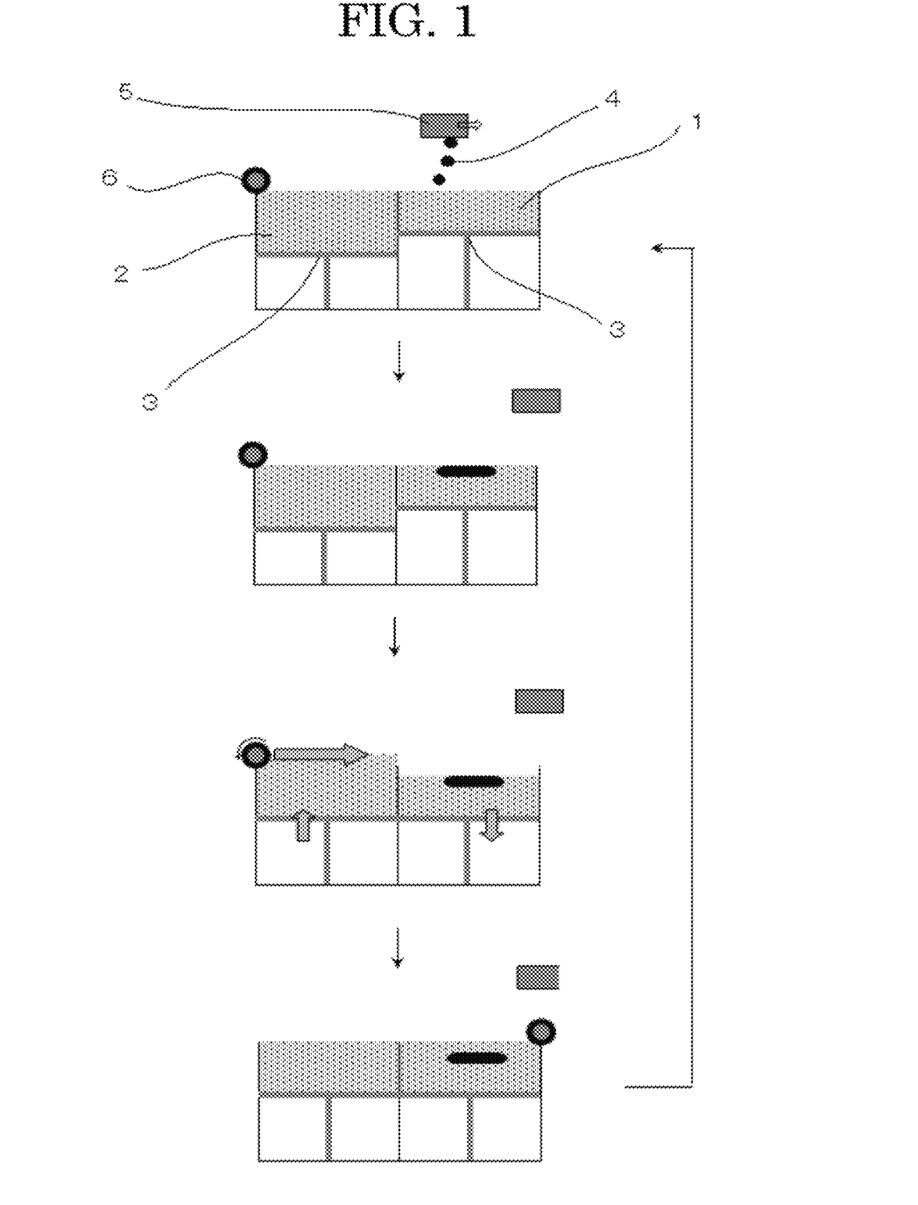
FIG. 1 is a schematic diagram showing an example of a three-dimensional object production apparatus used in the present invention.

FIG. 1 shows an example of a three-dimensional object production apparatus used in the present invention. The three-dimensional object production apparatus of FIG. 1 includes a formation-side powder storage tank 1 and a supply-side powder storage tank 2. These powder storage tanks each have a stage 3 capable of moving upward and downward. The three-dimensional object formation powder material is mounted over the stage 3, and a layer of the three-dimensional object formation powder material is formed.

The apparatus includes an inkjet head 5 above the formation-side powder storage tank 1, and a leveling machine 6 (hereinafter may be referred to as recoater). The inkjet head 5 is configured to jet an aqueous liquid 4 toward the three-dimensional object formation powder material in the formation-side powder storage tank. The leveling machine 6 is configured to supply the three-dimensional object formation powder material from the supply-side powder storage tank 2 to the formation-side powder storage tank 1, and to level off the surface of (a layer of) the three-dimensional object formation powder material in the formation-side powder storage tank 1.

The aqueous liquid 4 is dropped from the inkjet head 5 onto the three-dimensional object formation powder material in the formation-side powder storage tank 1. The position onto which the aqueous liquid 4 is dropped is determined based on two-dimensional image data (slice data) representing a plurality of planer layers into which a three-dimensional object having a finally desired shape is sliced.

After image formation of one layer is completed, the stage 3 of the supply-side powder storage tank 2 is lifted up, and the stage 3 of the formation-side powder storage tank 1 is lifted down, which produces a height difference. An amount of the three-dimensional object formation powder material corresponding to the height difference is moved to the formation-side powder storage tank 1 by the leveling machine 6.

In this way, one new three-dimensional object formation powder material layer is formed over the surface of the three-dimensional object formation powder material layer that has been formed before. The thickness of one three-dimensional object formation powder material layer is about from several ten μm to 100 μm.

Then, image formation of another layer is performed over the newly formed three-dimensional object formation powder material layer, based on the slice data of the second layer. Through repetition of this process, a three-dimensional object is obtained. An object is obtained by heating and drying the three-dimensional object with an unillustrated drying unit.

Figure 2:
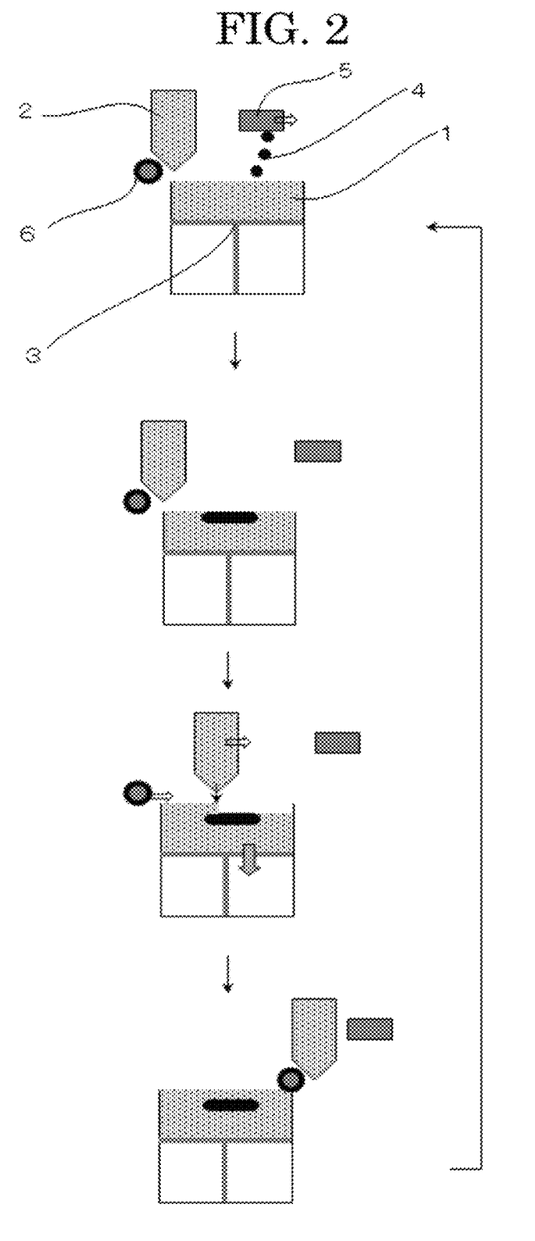
FIG. 2 is a schematic diagram showing another example of three-dimensional object production apparatus used in the present invention.

FIG. 2 shows another example of a three-dimensional object production apparatus of the present invention. The three-dimensional object production apparatus of FIG. 2 is identical with that of FIG. 1 in principle, but is different in the mechanism for supplying the three-dimensional object formation powder material. Specifically, the supply-side powder storage tank 2 is provided above the formation-side powder storage tank 1. When image formation of one layer is completed, the stage 3 of the formation-side powder storage tank 1 is lifted down by a predetermined amount, and the supply-side powder storage tank 2 moves while dropping a predetermined amount of the three-dimensional object formation powder material onto the formation-side powder storage tank 1, to thereby form a new three-dimensional object formation powder material layer. After this, the leveling machine 6 compresses the three-dimensional object formation powder material to a higher bulk density, and levels off the three-dimensional object formation powder material layer to a uniform height at the same time.

The three-dimensional object production apparatus having the configuration shown in FIG. 2 can be made smaller in size than the configuration of FIG. 1 in which two powder storage tanks are arranged side by side horizontally.

According to the three-dimensional object production method of the present invention described above, it is possible to produce a three-dimensional object (a hardened product to be sintered) having a complex stereoscopic (three-dimensional (3D)) shape easily, efficiently, without causing a shape collapse before sintering, etc., and with a good dimensional precision.

A three-dimensional object obtained in this way has a sufficient strength and excellent dimensional precision, and can reproduce minute asperity, a curved surface, etc. Therefore, it has an excellent aesthetic appearance and a high quality, and can be favorably used for various applications.

(Three-Dimensional Object)

A three-dimensional object of the present invention is produced according to the three-dimensional object production method of the present invention.

A voidage of the three-dimensional object is 15% or less, and preferably 10% or less. When the voidage is 15% or less, a three-dimensional object (a hardened product to be sintered) having few voids can be obtained.

The voidage can be obtained by, for example, Archimedes method.

EXAMPLES

Examples of the present invention will be described below. However, the present invention is not limited to these Examples by any means.
<Measurement of Number Average Particle Diameter of Cores>
The number average particle diameter of the cores was measured with a particle diameter measuring instrument (MICRO TRACK HRA manufactured by Nikkiso Co., Ltd.).

Example 1

—Production of Three-Dimensional Object Formation Powder Material 1—

First, a three-dimensional object formation particle liquid containing stainless steel (SUS316L) having a number average particle diameter of 1.2 μm (PSS316L manufactured by Sanyo Special Steel Co., Ltd.) (30 parts by mass), polyvinyl alcohol (PVA-205C manufactured by Kuraray Co., Ltd., with a degree of polymerization of 1,700, and a weight average molecular weight of 22,000) (0.3 parts by mass), and ion-exchanged water (70 parts by mass) was prepared.

The viscosity of the three-dimensional object formation particle liquid measured with a rotary viscometer (VISCOMATE VM-150III manufactured by Told Sangyo Co., Ltd.) at 25° C. was 3.2 mPa·s at 25° C.

Next, with a particle production apparatus described in JP-A No. 2011-212668, the prepared three-dimensional object formation particle liquid was jetted from four nozzles, at a drive frequency of 340 kHz, and at an air volume of 40 L/min, and the liquid droplets were dried and solidified, and cyclonically collected, to thereby produce a three-dimensional object formation powder material 1.

The content of the water-soluble resin in the obtained three-dimensional object formation powder material 1 was 2% by volume relative to the cores.

Here, to obtain the content (% by volume) of the water-soluble resin, the three-dimensional object formation powder material 1 was heated at 500° C. for 30 minutes with a differential scanning calorimeter (THERMO PLUS manufactured by Rigaku Corporation) under a nitrogen gas stream, to pyrolyze and volatilize the water-soluble resin, to thereby measure the mass of the cores, and calculate a mass difference between the mass of the cores and the mass of the powder before the heat history was applied in the unit of % by mass. Because different core materials have different densities, the content in the unit of % by mass was converted and expressed in the unit of % by volume.

The number average particle diameter Dn and the granularity distribution Dv/Dn of the obtained three-dimensional object formation powder material 1 measured in the manner described below was 15 μm, and 1.21, respectively.
<Measurement of Number Average Particle Diameter Dn and Ratio Dv/Dn of Dn to Volume Average Particle Diameter Dn>

The number average particle diameter Dn, and a ratio Dv/Dn of Dn to the volume average particle diameter Dv were measured with a commercially available particle diameter measuring instrument (MICRO TRACK HRA MT-3300EXII manufactured by Nikkiso Co., Ltd.).
<Evaluation of Flowability (Repose Angle))>

As the flowability, a repose angle of the three-dimensional object formation powder material 1 was measured with a commercially available repose angle measuring instrument (POWDER TESTER PT-N TYPE manufactured by Hosokawa Micron Corporation). As a result, it was 35°. There is a tendency that the greater the repose angle measurement, the poorer the flowability.
<Preparation of Aqueous Liquid 1>

An aqueous liquid 1 was prepared by dispersing water (70 parts by mass), 3-methyl-1,3-butanediol (manufactured by Tokyo Chemical Industry Co., Ltd.) as a water-soluble organic solvent (30 parts by mass), ammonium salt of zirconium carbonate (ZIRCOZOL AC-20 manufactured by Daiichi Kigenso Kagaku Kogyo Co., Ltd.) as a cross-linking agent (2 parts by mass), and EMULGEN LS106 (manufactured by Kao Corporation) as a surfactant (0.2 parts by mass) with a homomixer for 30 minutes.

Next, a three-dimensional object 1 was produced in the manner described below, using the obtained three-dimensional object formation powder material 1 and the aqueous liquid 1, a shape printing pattern having a size (5 mm in length×12 mm in width), and an inkjet-type three-dimensional object production apparatus.

(1) First, with a publicly-known three-dimensional object production apparatus as shown in FIG. 1, the three-dimensional object formation powder material 1 was moved from the supply-side powder storage tank to the formation-side powder storage tank, to thereby form a thin layer of the three-dimensional object formation powder material 1 having an average thickness of 100 μm.

(2) Next, with an inkjet printer (SG7100 manufactured by Ricoh Company, Ltd.), the aqueous liquid 1 was delivered (jetted) from the nozzle onto the surface of the formed thin layer of the three-dimensional object formation powder material 1, to dissolve the polyvinyl alcohol in the water contained in the aqueous liquid 1 and cross-link the polyvinyl alcohol by the action of the cross-linking agent (ammonium salt of zirconium carbonate) contained in the aqueous liquid 1.

(3) Next, the operations of (1) and (2) were repeated up to a predetermined total average thickness of 3 mm, to sequentially stack hardened thin layers of the three-dimensional object formation powder material 1, to thereby produce a three-dimensional object 1. The three-dimensional object 1 was subjected to a heating step by being heated with a dryer up to 50° C. in 1 hour, then maintained at 100° C. for 4 hours, and then cooled to 30° C. in 1 hour, to thereby obtain a three-dimensional object 1 having a height of 3 mm, a width of 12 mm, and a length of 50 mm.

The obtained three-dimensional object 1 was blown with air to remove any excess of the three-dimensional object formation powder material 1. As a result, the three-dimensional object 1 did not have a shape collapse. The three-dimensional object 1 was excellent in strength and dimensional precision.

The obtained three-dimensional object 1 was subjected to voidage measurement and a three-point bending test in the manners described below, and the dimensional precision of the three-dimensional object 1 was evaluated based on the criteria described below. The results are shown in Table 2.
<Voidage>

The voidage was calculated according to Archimedes method (MS403S/02 manufactured by Mettler-Toledo International Inc., a density measuring kit 0.1 mg, for 0.1 mg scale) based on the correlation between the masses of the three-dimensional object in air and in water.
<Three-Point Bending Test>

Figure 3:
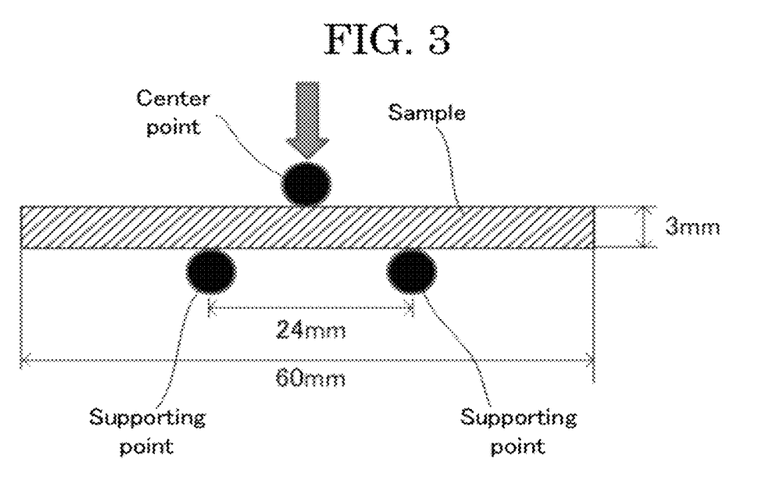
FIG. 3 is a diagram showing a testing method of a three-point bending test.

A test sample having a size of 10 mm in width×60 mm in length×3 mm in thickness was produced under the same conditions as described above. With AUTOGRAPH AGS-J manufactured by Shimadzu Corporation, and a three-point bending test jig, the test sample was subjected to a three-point bending test. In the test, the center point of the test sample was dented as shown in FIG. 3 in the thickness direction along the direction of the arrow of FIG. 3, to measure a three-point bending stress (MPa), which was evaluated based on the criteria described below. The distance between the supporting points was 24 mm.

[Evaluation Criteria]
A: 8.0 MPa or greater
B: 5.0 MPa or greater but less than 8.0 MPa
C: 3.0 MPa or greater but less than 5.0 MPa
D: Less than 3.0 MPa <Dimensional Precision>

A: The surface of the three-dimensional object was smooth and beautiful, and did not warp.

B: The surface condition of the three-dimensional object was good, but there was a slight warpage.

C: The surface of the three-dimensional object had slight distortion and undulation.

D: The surface of the three-dimensional object had distortion, and when the surface was observed, uneven distribution of the cores and the water-soluble resin was confirmed thereon.

(4) The three-dimensional object 1 obtained in (3) was subjected to a degreasing step by being heated with a dryer under a nitrogen atmosphere up to 500° C. in 3 hours and 58 minutes, then maintained at 400° C. for 4 hours, and cooled to 30° C. in 4 hours. Then, the three-dimensional object 1 was subjected to sintering in a sintering furnace under vacuum conditions at 1,400° C. As a result, a three-dimensional object (a sintered body) 1 having a beautiful surface was obtained. This three-dimensional object (a sintered body) 1 was a completely integrated stainless structure (metal lump), and did not have breakage or the like at all when slammed on a hard floor.

Example 2

A three-dimensional object 2 was produced in the same manner as in Example 1, except that the cores used in Example 1 were changed to stainless steel (SUS316L) (PSS316L manufactured by Sanyo Special Steel Co., Ltd., with a number average particle diameter of 4.7 μm), and evaluated in the same manner as in Example 1. The results are shown in Table 2.

Example 3

A three-dimensional object 3 was produced in the same manner as in Example 1, except that the cores used in Example 1 were changed to stainless steel (SUS316L) (PSS316L manufactured by Sanyo Special Steel Co., Ltd., with a number average particle diameter of 9.5 μm), and evaluated in the same manner as in Example 1. The results are shown in Table 2.

Example 4

A three-dimensional object 4 was produced in the same manner as in Example 2, except that the water-soluble resin used in Example 2 was changed to acetoacetyl group-modified polyvinyl alcohol (GOHSENX Z100 manufactured by Nippon Synthetic Chemical Industry Co., Ltd., with a degree of polymerization of 500), and evaluated in the same manner as in Example 1. The results are shown in Table 2.

Example 5

A three-dimensional object 5 was produced in the same manner as in Example 2, except that the water-soluble resin used in Example 2 was changed to polyvinyl alcohol (product number: 1,100 manufactured by Kuraray Co., Ltd., with a degree of polymerization of 200), and evaluated in the same manner as in Example 1. The results are shown in Table 2.

Example 6

A three-dimensional object 6 was produced in the same manner as in Example 2, except that the water-soluble resin used in Example 2 was changed to acetoacetyl group-modified polyvinyl alcohol (GOHSENX Z200 manufactured by Nippon Synthetic Chemical Industry Co., Ltd., with a degree of polymerization of 1,000), and evaluated in the same manner as in Example 1. The results are shown in Table 2.

Example 7

A three-dimensional object 7 was produced in the same manner as in Example 2, except that the water-soluble resin used in Example 2 was changed to butanediol-vinyl alcohol copolymer (NICHIGO G-POLYMER OKS-8041 manufactured by Nippon Synthetic Chemical Industry Co., Ltd., with a degree of polymerization of 500), and evaluated in the same manner as in Example 1. The results are shown in Table 2.

Example 8

A three-dimensional object 8 was produced in the same manner as in Example 2, except that the content of the water-soluble resin in the three-dimensional object formation powder material in Example 2 was changed to 0.5% by volume, and evaluated in the same manner as in Example 1. The results are shown in Table 2.

Example 9

A three-dimensional object 9 was produced in the same manner as in Example 2, except that the content of the water-soluble resin in the three-dimensional object formation powder material in Example 2 was changed to 8% by volume, and evaluated in the same manner as in Example 1. The results are shown in Table 2.

Example 10

A three-dimensional object 10 was produced in the same manner as in Example 2, except that the content of the water-soluble resin in the three-dimensional object formation powder material in Example 2 was changed to 15% by volume, and evaluated in the same manner as in Example 1. The results are shown in Table 2.

Example 11

A three-dimensional object 11 was produced in the same manner as in Example 1, except that the cores used in Example 1 were changed to ZrO$_2$ (TZ-B53 manufactured by Tosoh Corporation, with a number average particle diameter of 2.4 µm), and evaluated in the same manner as in Example 1. The results are shown in Table 2.

Example 12

A three-dimensional object 12 was produced in the same manner as in Example 2, except that the water-soluble resin used in Example 2 was changed to sodium polyacrylate (JULIMER AC-10LHP manufactured by Toagosei Co., Ltd., with a degree of polymerization of 1,700), and evaluated in the same manner as in Example 1. The results are shown in Table 2.

Example 13

A three-dimensional object 13 was produced in the same manner as in Example 2, except that the water-soluble resin used in Example 2 was changed to starch (HISTARD PSS0-5 manufactured by Sanwa Starch Co., Ltd., with a degree of polymerization of 1,700), and evaluated in the same manner as in Example 1. The results are shown in Table 2.

Example 14

A three-dimensional object 14 was produced in the same manner as in Example 2, except that the water-soluble resin used in Example 2 was changed to carboxy methyl cellulose sodium (CELLOGEN 5A manufactured by DKS Co., Ltd., with a degree of polymerization of 1,700), and evaluated in the same manner as in Example 1. The results are shown in Table 2.

Example 15

A three-dimensional object 15 was produced in the same manner as in Example 2, except that the water-soluble resin used in Example 2 was changed to gelatin (BEMATRIX GELATIN manufactured by Nitta Gelatin Inc., with a degree of polymerization of 1,700), and evaluated in the same manner as in Example 1. The results are shown in Table 2.

Example 16

A three-dimensional object 16 was produced in the same manner as in Example 2, except that the water-soluble resin used in Example 2 was changed to polyethylene glycol (PEG-1000 manufactured by Wako Pure Chemical Industries, Ltd., with a degree of polymerization of 4,000), and evaluated in the same manner as in Example 1. The results are shown in Table 2.

Example 17

A three-dimensional object formation powder material 17 was produced in the same manner as in Example 1, except that unlike in Example 1, the three-dimensional object formation particle liquid was granulated with a spray dryer (device name: ADL31-A manufactured by Yamato Scientific Co., Ltd.). The detail of the spray dry method is described in JP-A No. 2008-304901.

The content of the water-soluble resin in the obtained three-dimensional object formation powder material 17 was 2% by volume relative to the cores.

The number average particle diameter Dn, the granularity distribution Dv/Dn, and the repose angle of the obtained three-dimensional object formation powder material 17 measured in the same manner as in Example 1 were 28 µm, 1.4, and 37°, respectively.

Next, a three-dimensional object 17 was produced in the same manner as in Example 1 using the obtained three-dimensional object formation powder material 17, and the aqueous liquid 1, and evaluated in the same manner as in Example 1. The results are shown in Table 2.

Example 18

A three-dimensional object 18 was produced in the same manner as in Example 17, except that the cores used in Example 17 were changed to glass beads (SPL-30 manufactured by Unitika Limited, with a number average particle diameter of 28.8 µm), and evaluated in the same manner as in Example 1. The results are shown in Table 2.

Example 19

A three-dimensional object 19 was produced in the same manner as in Example 17, except that the cores used in Example 17 were changed to glass beads (SPL-30 manufactured by Unitika Limited, with a number average particle diameter of 28.3 µm), and evaluated in the same manner as in Example 1. The results are shown in Table 2.

Example 20

A three-dimensional object 20 was produced in the same manner as in Example 17, except that the cores used in Example 17 were changed to micro glass beads (EMB-10 manufactured by Potters Ballotini Co., Ltd., with a number average particle diameter of 4.5 µm), and evaluated in the same manner as in Example 1. The results are shown in Table 2.

Comparative Example 1

A three-dimensional object 21 was produced in the same manner as in Example 3, except that unlike in Example 3, a rolling fluid bed was used as a water-soluble resin coating method for the three-dimensional object formation powder material, and the cores were coated with the water-soluble resin uniformly to thereby form a uniform thin film over a single core. The three-dimensional object 21 was evaluated in the same manner as in Example 1. The results are shown in Table 2.

From the results in Table 2, the voidage of the three-dimensional object formed by stacking layers of particles each formed of a single coated core was not very much different.

TABLE 1

| | Cores | | Water-soluble resin | | |
|---|---|---|---|---|---|
| | Number ave. particle diameter (μm) | Material | Kind | Degree of polymerization | Content (% by volume) |
| Ex. 1 | 1.2 | SUS316L | Polyvinyl alcohol | 1,700 | 2 |
| Ex. 2 | 4.7 | SUS316L | Polyvinyl alcohol | 1,700 | 2 |
| Ex. 3 | 9.5 | SUS316L | Polyvinyl alcohol | 1,700 | 2 |
| Ex. 4 | 4.7 | SUS316L | Acetoacetyl group-modified polyvinyl alcohol | 500 | 2 |
| Ex. 5 | 4.7 | SUS316L | Polyvinyl alcohol | 200 | 2 |
| Ex. 6 | 4.7 | SUS316L | Acetoacetyl group-modified polyvinyl alcohol | 1,000 | 2 |
| Ex. 7 | 4.7 | SUS316L | Butanediol-vinyl alcohol copolymer | 500 | 2 |
| Ex. 8 | 4.7 | SUS316L | Polyvinyl alcohol | 1,700 | 0.5 |
| Ex. 9 | 4.7 | SUS316L | Polyvinyl alcohol | 1,700 | 8 |
| Ex. 10 | 4.7 | SUS316L | Polyvinyl alcohol | 1,700 | 15 |
| Ex. 11 | 2.4 | $ZrO_2$ | Polyvinyl alcohol | 1,700 | 2 |
| Ex. 12 | 4.7 | SUS316L | Sodium polyacrylate | 1,700 | 2 |
| Ex. 13 | 4.7 | SUS316L | Starch | 1,700 | 2 |
| Ex. 14 | 4.7 | SUS316L | Carboxy methyl cellulose sodium | 1,700 | 2 |
| Ex. 15 | 4.7 | SUS316L | Gelatin | 1,700 | 2 |
| Ex. 16 | 4.7 | SUS316L | Polyethylene glycol | 4,000 | 2 |
| Ex. 17 | 1.2 | SUS316L | Polyvinyl alcohol | 1,700 | 2 |
| Ex. 18 | 28.8 | $SiO_2$—CaO—$Na_2O$—$Al_2O_3$ | Polyvinyl alcohol | 1,700 | 2 |
| Ex. 19 | 28.3 | $SiO_2$—$BaTiO_3$—$Al_2O_3$ | Polyvinyl alcohol | 1,700 | 2 |
| Ex. 20 | 4.5 | $SiO_2$—$Al_2O_3$—$B_2O_3$ | Polyvinyl alcohol | 1,700 | 2 |
| Comp. Ex. 1 | 9.5 | SUS316L | Polyvinyl alcohol | 1,700 | 2 |

TABLE 2

| | 3D object formation powder material | | | | 3D object evaluation | | |
|---|---|---|---|---|---|---|---|
| | Number ave. particle diameter (μm) | Dv/Dn | Repose angle (°) | Voidage (%) | Three-point bending stress Measured value (MPa) | Evaluation | Dimensional precision |
| Ex. 1 | 15 | 1.21 | 35 | 5.6 | 10.5 | A | A |
| Ex. 2 | 30 | 1.3 | 47 | 10.5 | 9.8 | A | A |
| Ex. 3 | 48 | 1.22 | 95 | 15.8 | 6.8 | B | C |
| Ex. 4 | 30 | 1.3 | 47 | 4.3 | 8.8 | A | A |
| Ex. 5 | 30 | 1.3 | 47 | 4.5 | 9.2 | A | A |
| Ex. 6 | 27 | 1.4 | 47 | 8.6 | 7.5 | B | A |
| Ex. 7 | 30 | 1.3 | 47 | 8.6 | 7.4 | B | A |
| Ex. 8 | 30 | 1.3 | 47 | 8.9 | 5.2 | B | A |
| Ex. 9 | 30 | 1.3 | 47 | 9.2 | 8.7 | A | A |
| Ex. 10 | 30 | 1.3 | 47 | 6.5 | 5.4 | B | A |
| Ex. 11 | 30 | 1.3 | 24 | 3.3 | 5.1 | B | A |
| Ex. 12 | 30 | 1.3 | 47 | 6.9 | 4.8 | C | A |
| Ex. 13 | 30 | 1.3 | 47 | 12.5 | 4.2 | C | A |
| Ex. 14 | 30 | 1.3 | 47 | 10.3 | 6.6 | B | A |
| Ex. 15 | 30 | 1.3 | 47 | 12.1 | 4.2 | C | A |
| Ex. 16 | 24 | 1.4 | 47 | 12.6 | 5.6 | B | A |
| Ex. 17 | 28 | 1.4 | 37 | 4.8 | 9.1 | A | A |
| Ex. 18 | 142 | 1.4 | 102 | 20.6 | 5.9 | C | C |
| Ex. 19 | 139 | 1.4 | 96 | 22.0 | 5.6 | C | C |
| Ex. 20 | 33 | 1.3 | 47 | 7.9 | 7.1 | B | A |
| Comp. Ex. 1 | 9.6 | 1.91 | 45 | 45 | 2.8 | D | C |

Aspects of the present invention are, for example, as follows.
<1> A three-dimensional object formation powder material used for three-dimensional object formation of forming a three-dimensional object by stacking up a plurality of powder material layers each bound by a resin and having a predetermined shape, the three-dimensional object formation powder material including:
particles in which a plurality of cores are fixed by a water-soluble resin.

<2> The three-dimensional object formation powder material according to <1>,
wherein the three-dimensional object formation powder material has a number average particle diameter Dn of from 15 μm to 50 μm, and
wherein a ratio (Dv/Dn) of a volume average particle diameter Dv of the three-dimensional object formation powder material to the number average particle diameter Dn thereof is 1.4 or less.

<3> The three-dimensional object formation powder material according to <1> or <2>,
wherein the cores have a number average particle diameter of from 1 μm to 10 μm.

<4> The three-dimensional object formation powder material according to any one of <1> to <3>,
wherein a content of the water-soluble resin is from 0.5% by volume to 15% by volume relative to the cores.

<5> The three-dimensional object formation powder material according to <4>,
wherein the water-soluble resin is a polyvinyl alcohol resin, a modified polyvinyl alcohol resin, a polyacrylic acid resin, a cellulose resin, starch, gelatin, polyethylene glycol, or any combination thereof.

<6> The three-dimensional object formation powder material according to any one of <1> to <5>,
wherein the water-soluble resin has a degree of polymerization of from 100 to 2,000.

<7> The three-dimensional object formation powder material according to any one of <1> to <6>,
wherein the three-dimensional object formation powder material is produced according to a spray granulation method.

<8> The three-dimensional object formation powder material according to any one of <1> to <7>,
wherein the cores are metal particles, ceramic particles, or both thereof.

<9> The three-dimensional object formation powder material according to <8>,
wherein the ceramic particles are made of glass.

<10> A three-dimensional object formation material set, including:
the three-dimensional object formation powder material according to any one of <1> to <9>; and
an aqueous liquid.

<11> The three-dimensional object formation material set according to <10>,
wherein the aqueous liquid contains a cross-linking agent.

<12> A three-dimensional object production method, including:
forming a three-dimensional object formation powder material layer over a supporting member with the three-dimensional object formation powder material according to any one of <1> to <9>; and
delivering an aqueous liquid to a predetermined region of the three-dimensional object formation powder material layer to form a hardened product of the three-dimensional object formation powder material layer.

<13> The three-dimensional object production method according to <12>,
wherein the aqueous liquid contains a cross-linking agent.

<14> The three-dimensional object production method according to <12> or <13>, further including:
sintering the hardened product obtained in the formation of a hardened product.

<15> The three-dimensional object production method according to any one of <12> to <14>,
wherein the delivery of the aqueous liquid is performed according to an inkjet method.

<16> A three-dimensional object produced according to the three-dimensional object production method according to any one of <12> to <15>,
wherein the three-dimensional object has a voidage of 15% or less.

<17> The three-dimensional object formation powder material according to any one of <4> to <9>,
wherein the water-soluble resin is a polyvinyl alcohol resin or a modified polyvinyl alcohol resin.

<18> The three-dimensional object formation powder material according to any one of <9> to <17>,
wherein the three-dimensional object formation powder material is produced according to a spray dry method.

<19> The three-dimensional object formation material set according to <11>,
wherein the cross-linking agent is a metal salt.

<20> The three-dimensional object production method according to <13>,
wherein the cross-linking agent is a metal salt.

This application claims priority to Japanese application No. 2014-162593, filed on Aug. 8, 2014 and incorporated herein by reference, and Japanese application No. 2015-111482, filed on Jun. 1, 2015 and incorporated herein by reference.

What is claimed is:

1. A three-dimensional object formation powder material, comprising:
particles in which a plurality of cores are fixed by a water-soluble resin,
wherein the cores are transition metal particles, selected from the group consisting of stainless steel, iron, copper, silver, titanium, zirconium and alloys thereof,
wherein the three-dimensional object formation powder material has a number average particle diameter Dn of from 15 μm to 30 μm, and
wherein a ratio (Dv/Dn) of a volume average particle diameter Dv of the three-dimensional object formation powder material to the number average particle diameter Dn thereof is 1.4 or less.

2. The three-dimensional object formation powder material according to claim 1, wherein the cores have a number average particle diameter of from 1 μm to 10 μm.

3. The three-dimensional object formation powder material according to claim 1, wherein a content of the water-soluble resin is from 0.5% by volume to 15% by volume relative to the cores.

4. The three-dimensional object formation powder material according to claim 3, wherein the water-soluble resin is a polyvinyl alcohol resin, a modified polyvinyl alcohol resin, a polyacrylic acid resin, a cellulose resin, starch, gelatin, polyethylene glycol, or any combination thereof.

5. The three-dimensional object formation powder material according to claim 1, wherein the water-soluble resin has a degree of polymerization of from 100 to 2,000.

6. The three-dimensional object formation powder material according to claim 1, wherein the three-dimensional object formation powder material is produced according to a spray granulation method.

7. The three-dimensional object formation powder material according to claim 1, wherein
the cores comprise at least one selected from the group consisting of stainless steel and zirconium, the water-soluble resin is a polyvinyl alcohol resin, a modified polyvinyl alcohol resin, a polyacrylic acid resin, a cellulose resin, starch, gelatin, polyethylene glycol, or any combination thereof, wherein the water-soluble resin has a degree of polymerization of from 200 to 1,700, and a content of the water-soluble resin is from 0.5 to 15% by volume relative to the cores.

8. A three-dimensional object formation material set, comprising:

the three-dimensional object formation powder material according to claim 1; and an aqueous liquid.

9. The three-dimensional object formation material set according to claim 8, wherein the aqueous liquid comprises a cross-linking agent.

10. A three-dimensional object production method, comprising:

forming a three-dimensional object formation powder material layer over a supporting member with the three-dimensional object formation powder material according to claim 1; and delivering an aqueous liquid to a predetermined region of the three-dimensional object formation powder material layer to form a hardened product of the three-dimensional object formation powder material layer.

11. The three-dimensional object production method according to claim 10, wherein the aqueous liquid comprises a cross-linking agent.

12. The three-dimensional object production method according to claim 10, further comprising:

sintering the hardened product obtained in the formation of a hardened product.

13. The three-dimensional object production method according to claim 10, wherein the delivery of the aqueous liquid is performed according to an inkjet method.

14. A three-dimensional object produced according to the three-dimensional object production method according to claim 10, wherein the three-dimensional object has a voidage of 15% or less.

* * * * *